United States Patent

Miener et al.

[11] Patent Number: 5,390,649
[45] Date of Patent: Feb. 21, 1995

[54] METHOD FOR CONTROLLING AN INTERNAL COMBUSTION ENGINE OPERATING WITH EXHAUST GAS RECIRCULATION

[75] Inventors: Bjoern Miener; Markus Gleissner, both of Regensburg, Germany

[73] Assignee: Siemens Aktiengesellschaft, Munich, Germany

[21] Appl. No.: 73,121

[22] Filed: Jun. 7, 1993

[30] Foreign Application Priority Data

Jun. 5, 1992 [EP] European Pat. Off. ........ 92109583.2

[51] Int. Cl.⁶ ............................................ F02M 15/00
[52] U.S. Cl. .................................................. 123/676
[58] Field of Search ......................... 123/676, 568, 527

[56] References Cited

U.S. PATENT DOCUMENTS

| | | | |
|---|---|---|---|
| 4,290,404 | 9/1981 | Hata et al. | 123/571 |
| 4,509,485 | 4/1985 | Hasegawa | 123/676 |
| 4,598,684 | 7/1986 | Kato et al. | 123/676 |
| 4,683,857 | 8/1987 | Yasuoka | 123/676 |
| 4,694,812 | 9/1987 | Wendt | 123/571 |
| 5,103,791 | 4/1992 | Tomisawa | 123/676 |
| 5,215,068 | 6/1993 | Kato | 123/676 |
| 5,216,881 | 6/1993 | Anlauf et al. | 123/676 |

FOREIGN PATENT DOCUMENTS

| | | | |
|---|---|---|---|
| 3217287 | 4/1984 | Germany | 123/676 |
| 59-231146 | 12/1984 | Japan | 123/676 |
| 61-215426 | 9/1986 | Japan | 123/676 |
| 2036863 | 7/1980 | United Kingdom | 123/676 |

Primary Examiner—Raymond A. Nelli
Attorney, Agent, or Firm—Herbert L. Lerner; Laurence A. Greenberg

[57] ABSTRACT

An internal combustion engine operating with exhaust gas recirculation and including an intake-tube-pressure-guided injection system, has an intake tube with a throttle valve, an exhaust pipe, a return conduit branching off from the exhaust pipe and discharging into the intake tube downstream of the throttle valve, an exhaust gas recirculation valve being disposed in the return conduit and having a valve stroke, an actuator influencing a degree of opening of the conduit for controlling an exhaust gas recirculation rate, and a stroke sensor detecting a degree of opening of the exhaust gas recirculation valve over its valve stroke for establishing an optimal exhaust gas recirculation rate, and taking the degree of opening of the exhaust gas recirculation valve into account in a calculation of an injection time for injection valves. A method for controlling the internal combustion engine includes correcting the injection time with a pilot control value being dependent on rpm and on a pressure difference between an intake tube pressure in the intake tube and an exhaust gas counterpressure in the exhaust pipe, and weighting the pilot control value with a stroke factor being formed from the opening degree and a load-dependent, predetermined command value of the exhaust gas recirculation valve and taking a stroke influence into account.

6 Claims, 2 Drawing Sheets

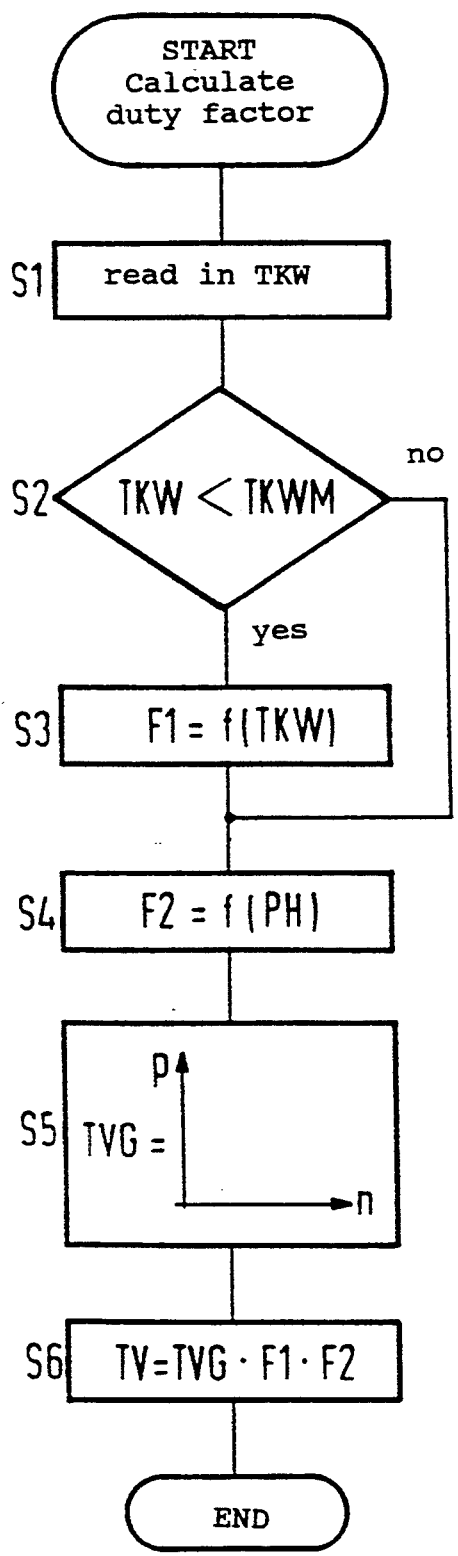
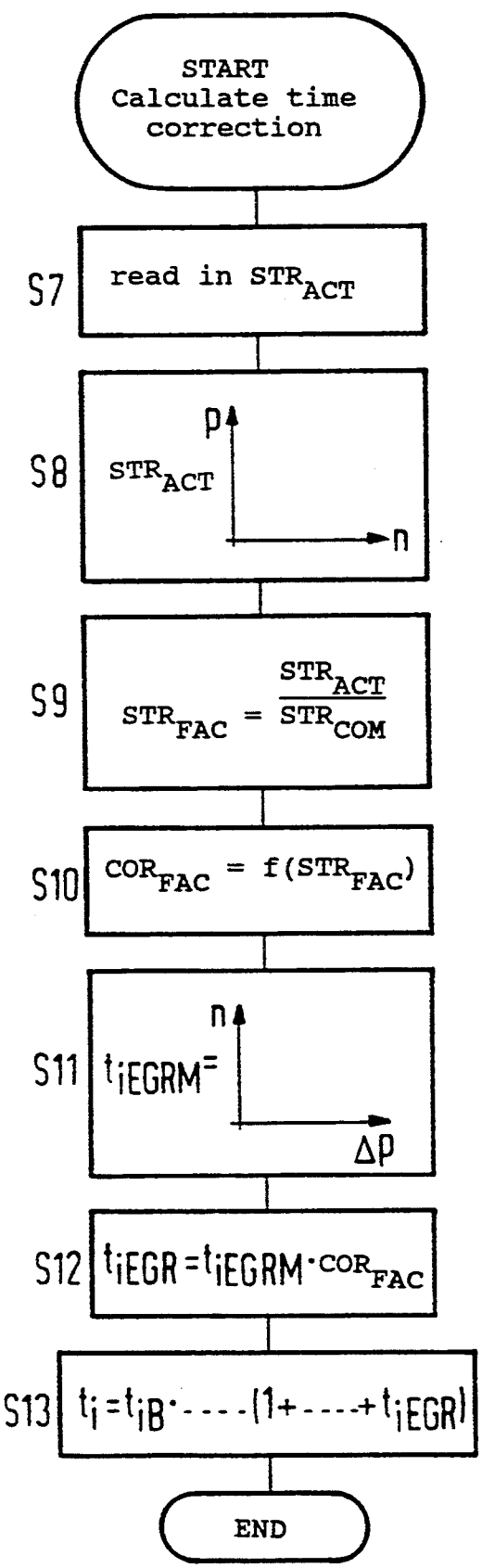

METHOD FOR CONTROLLING AN INTERNAL COMBUSTION ENGINE OPERATING WITH EXHAUST GAS RECIRCULATION

The invention relates to a method for controlling an internal combustion engine that operates with exhaust gas recirculation and includes an intake-tube-pressure-guided injection system having an exhaust gas recirculation valve being disposed in a return conduit branching off from an exhaust pipe and discharging into an intake tube downstream of a throttle valve, with the degree of opening of the conduit being influenceable for controlling an exhaust gas recirculation rate, with the aid of an actuator, and the degree of opening of the exhaust gas recirculation valve over its valve stroke being detected by means of a stroke sensor in order to establish an optimal exhaust gas recirculation rate and is taken into account in the calculation of an injection time for injection valves.

German Patent DE 32 17 287 C2, corresponding to U.S. Pat. No. 4,409,948, describes an exhaust gas recirculation control system in which the engine has an exhaust gas recirculation conduit that connects the exhaust pipe with the intake tube, and in which an exhaust gas recirculation valve (EGR valve) has a controllable valve opening and is provided for opening and closing the conduit. A number of different valve opening values of the EGR valve are stored in a memory, and they in turn are functions of the operating conditions of the engine. A stroke sensor disposed in the EGR valve detects the current value of the valve opening, and then that value is compared with the stored value, and the EGR valve is triggered accordingly, so that the difference between the command value and the actual value is minimized.

U.S. Pat. No. 4,598,684 discloses an internal combustion engine that is equipped with an exhaust gas recirculation system. The exhaust gas recirculation valve used therein has a stroke sensor that furnishes a linear output signal in accordance with the position of the valve. The quantity of recirculated exhaust gas corresponds to the signal of the stroke sensor, and the basic injection time for the injection valve, with active exhaust gas recirculation, is weighted with a correction factor as a function of the rpm, the intake tube pressure and the atmospheric pressure, and leads to shorter injection times than with inactive exhaust gas recirculation.

As a result of the exhaust gas recirculation, the cylinders of the engine receive a reduced filling of a fuel-air mixture. Since the recirculated exhaust gas components can no longer participate in combustion, the combustion temperature is lowered, and as a result substantially fewer nitrogen oxides are produced in combustion. However, the exhaust gas content of hydrocarbons and CO cannot be reduced by exhaust gas recirculation. In fact, the exhaust gas recirculation rate must be metered as precisely as possible. In other words, the opening cross section of the valve must be set precisely, because otherwise an increase in the proportion of hydrocarbons and CO in the exhaust gas can occur.

In conventional fuel injection systems for internal combustion engines, a basic injection quantity (basic injection time) is ascertained from a performance graph, as a function of the engine load and rpm. In order to ascertain the load, with intake tube pressure-guided injection, the signal of a negative pressure sensor in the intake tube is used. Since the intake tube pressure, as a measure of the injection time to be selected, is determined not only by the quantity of fresh air being aspirated but also by the quantity of recirculated exhaust gas, the basic injection time must be corrected as a function of the exhaust gas recirculation rate.

It is accordingly an object of the invention to provide a method for controlling an internal combustion engine having an exhaust gas recirculation system, which overcomes the hereinafore-mentioned disadvantages of the heretofore-known methods of this general type and which enables a correction of the injection time for the injection valve in a simple way as a function of the exhaust gas recirculation rate, so that for every engine operating point at which the exhaust gas recirculation is active, the quantity of fuel required for optimal combustion will be metered.

With the foregoing and other objects in view there is provided, in accordance with the invention, a method for controlling an internal combustion engine operating with exhaust gas recirculation and including an intake-tube-pressure-guided injection system having an intake tube with a throttle valve, an exhaust pipe, a return conduit branching off from the exhaust pipe and discharging into the intake tube downstream of the throttle valve, an exhaust gas recirculation valve being disposed in the return conduit and having a valve stroke, an actuator influencing a degree of opening of the conduit for controlling an exhaust gas recirculation rate, and a stroke sensor detecting a degree of opening of the exhaust gas recirculation valve over its valve stroke for establishing an optimal exhaust gas recirculation rate, and taking the degree of opening of the exhaust gas recirculation valve into account in a calculation of an injection time for injection valves, which comprises correcting the injection time with a pilot control value being dependent on rpm and on a pressure difference between an intake tube pressure in the intake tube and an exhaust gas counterpressure in the exhaust pipe, and weighting the pilot control value with a stroke factor being formed from the opening degree and a load-dependent, predetermined command value of the exhaust gas recirculation valve and taking a stroke influence into account in the stroke factor.

In accordance with another mode of the invention, there is provided a method which comprises forming an associated stroke correction factor for each stroke factor, and taking nonlinearity of the exhaust gas recirculation quantity over the valve stroke into account in the associated stroke correction factor.

In accordance with a further mode of the invention, wherein the actuator is an electropneumatic valve, there is provided a method which comprises triggering the electropneumatic valve with a duty cycle dependent on a load state of the engine, acting upon an intake side of the actuator with the intake tube pressure, and acting upon the exhaust gas recirculation valve with the actuator through a control pressure dependent on a duty factor and on the intake tube pressure.

In accordance with an added mode of the invention, there is provided a method which comprises forming the duty factor for the actuator from a basic duty factor dependent on the rpm and the intake tube pressure, from a warmup ramp, and from an altitude correction.

In accordance with a concomitant mode of the invention, there is provided a method which comprises forming an associated stroke correction factor for each stroke factor, taking nonlinearity of the exhaust gas recirculation quantity over the valve stroke into account in the associated stroke correction factor, and storing values for the basic duty factor, the warmup ramp, the altitude correction, the command value, the stroke factor, the pilot control value and the correction factor, in performance graphs of an electronic control unit of the engine.

Other features which are considered as characteristic for the invention are set forth in the appended claims.

Although the invention is illustrated and described herein as embodied in a method for controlling an internal combustion engine operating with exhaust gas recirculation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF FIGURES

FIGS. 2 and 3 are flow charts for ascertaining an injection time that takes the exhaust gas recirculation into account.

Figure 1:
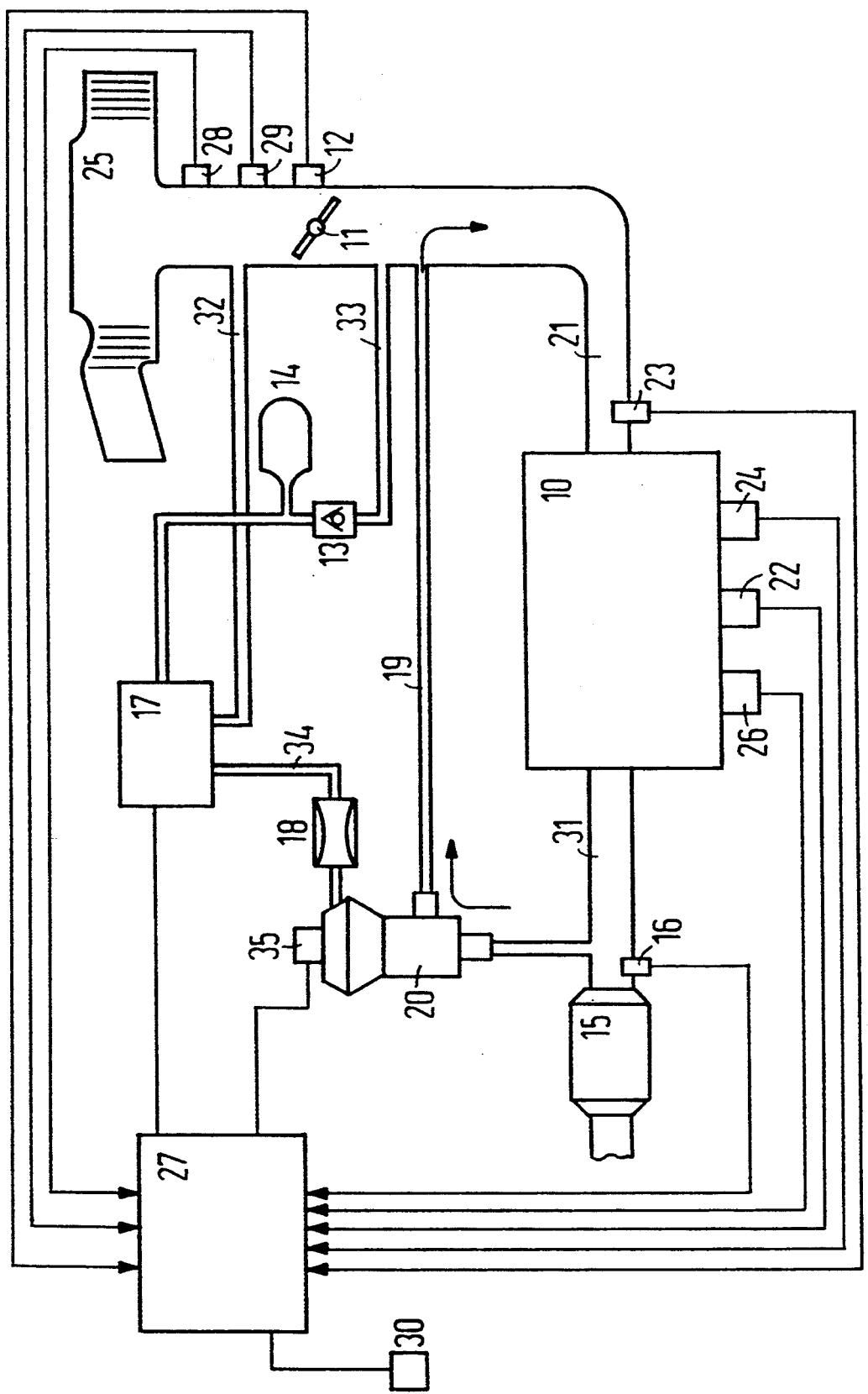
FIG. 1 is a simplified schematic and block circuit diagram of an internal combustion engine with exhaust gas recirculation, for performing the method of the invention.

Referring now to the figures of the drawing in detail and first, particularly, to FIG. 1 thereof, it is seen that reference numeral 10 indicates an internal combustion engine, which has an intake tube 21 and an exhaust pipe 31. The requisite fresh air for combustion flows through an air filter 25 and past a throttle valve 11 into non-illustrated cylinders of the engine 10. A throttle valve switch 12 detects the position (full-load or idling position) of the throttle valve 11 and has an output side which is connected to a signal input of an electronic control unit 27. In order to detect the temperature of the fresh air and the negative pressure in the intake tube 21, respective sensors 28 and 29 are disposed in the intake tube 21 upstream of the throttle valve 11. Output signals of these two sensors 28, 29 are also delivered to the electronic control unit 27. A three-way catalytic converter 15 for converting the constituents HC, CO and NO$_x$ contained in the exhaust gas is connected into the exhaust pipe 31. At a point upstream of the catalytic converter, there is an exhaust gas sensor 16 in the form of a lambda sensor for detecting the oxygen concentration in the exhaust gas. Other input variables are delivered to the electronic control unit 27 from a crankshaft angle transducer 26, an rpm sensor 22, a coolant temperature sensor 24, and an atmospheric pressure sensor 30.

As a function of the engine load and rpm, a microcomputer included in the electronic control unit 27 determines a basic injection time corresponding to a basic injection quantity of fuel, which is metered by an injection valve 23. In the case of intake-tube-pressure-guided injection as shown herein, the output signal of the pressure sensor 29 in the intake tube 21 is used for ascertaining the load.

In order to recirculate some of the exhaust gas in a direction indicated by arrow symbols, an exhaust gas recirculation line 19 is provided. The exhaust gas recirculation line 19 connects the exhaust pipe 31 to the intake tube 21 in such a way that exhaust gas is diverted upstream of the catalytic converter 15 and the lambda sensor 16 and returns to the intake tube 21 again downstream of the throttle valve 11. Incorporated into the exhaust gas recirculation line 19 is a pneumatic exhaust gas recirculation valve (EGR valve) 20, which opens up a more or less large cross section from the exhaust gas recirculation line 19 to the intake tube 21, depending on the way in which it is triggered. In order to trigger the EGR valve 20, an electropneumatic actuator (control valve) 17 has an input side which is connected to the intake tube 21 both through a line 32 upstream of the throttle valve 11 and through a line 33 downstream of the throttle valve 11. A check valve 13 with a pressure accumulator 14 is inserted into this line 33. On the output side, the control valve 17 is connected to the EGR valve 20 through a line 34. In order to avert any pressure fluctuations that might occur, a throttle 18 is introduced into this line 34. In order to provide electrical triggering of the control valve 17, this valve is connected to the electronic control unit 27 over a signal line which is not identified by a reference numeral. In order to ascertain the opening cross section of the EGR valve 20 in the exhaust gas recirculation line 19, a stroke sensor 35 is provided in the EGR valve. The stroke sensor 35 detects the piston stroke of the valve 20, for instance by means of a potentiometer pickup, and delivers a voltage that is proportional to the valve stroke, to the electronic control unit 27 in order to provide positional feedback.

A total injection time $t_i$ for the injection valves 23 is composed of a basic injection time $t_{iB}$, which is read out as a function of an operating point from a performance graph in which an intake tube pressure p and engine rpm n are plotted, and a number of correction factors, with which this basic injection time $t_{iB}$ is adapted to the most varied operating conditions. In engines with exhaust gas recirculation systems, not only such correction factors as starting enrichment, warmup phase, acceleration enrichment and overrunning reduction but also the quantity of recirculated exhaust gas, must be taken into account in fuel metering. In the following formula, which is definitive for calculating the total injection time $t_i$, $$t_i = t_{iB}{}^x \ldots {}^x (1 + \ldots + t_{iEGR}) \tag{1}$$

the influence of the exhaust gas recirculation is therefore taken into account by means of a correction factor $t_{iEGR}$. The other correction factors mentioned above have been left out of formula (1) for the sake of simplicity. The intake tube pressure p is present at the input of the actuator 17 for the exhaust gas recirculation valve 20, and this actuator switches back and forth between ambient pressure and intake tube pressure as a result of suitable triggering. The result at the output of the actuator is then a resultant pressure (control pressure), which is represented as a function of the intake tube pressure p and a duty factor TV with which the actuator is triggered. The duty factor TV is turn is composed of a basic duty factor TVG and second correction factors F1, F2, which take into account the warmup of the engine or the absolute altitude and therefore the air pressure (air density, air temperature). The values for the basic duty factor TVG are stored in a performance graph of the electronic control unit as a function of the intake tube pressure p and engine rpm n. The factor F1 for the warmup phase is stored in a table as a function of a coolant temperature TKW, and the factor F2 for the altitude correction is stored in a table as a function of the absolute altitude. The following relationship thus pertains for the duty factor:

$$TV = TVG \cdot F1 \cdot F2 \tag{2}$$

so that through the temperature of the coolant, the basic duty factor TVG can be weighted by a factor $0 < F1 < 1$, and as a function of the calculated altitude (calculated from the intake tube pressure p, for instance) it can be weighted by a factor $0 < F2 < 1$. If one of the two factors is 0, then the duty factor becomes 0, and no exhaust gas recirculation takes place (equivalent to a 0% duty factor). If both factors are 1, the entire exhaust gas recirculation that is sought is operative (equivalent to a 100% duty factor).

The motion of the piston in the exhaust gas recirculation valve 20, which is caused by triggering the actuator 17, is detected by the stroke sensor 35 assigned to that valve and is delivered as an actual value ($STR_{ACT}$) of the piston position to the electronic control unit 27 in the form of an electric voltage signal. In a memory of the electronic control unit, command values $STR_{COM}$ for the basic duty factor are stored in a performance graph on which the engine rpm n and the intake tube pressure p are plotted. The ratio of the actual value $STR_{ACT}$ to the command value $STR_{COM}$ stored in the performance graph defines a stroke factor $STR_{FAC}$. This stroke factor is also stored in memory in a performance graph and determines a stroke correction factor $COR_{FAC}$. Analogously to the values for the warmup factor and altitude correction factor, the values for the stroke correction factor, are between 0 and 1.

Since a pressure difference $\Delta p$ between the pressure p in the intake tube 21 and the counterpressure of the exhaust gas upstream of the catalytic converter 15 is a measure of the recirculated quantity of exhaust gas through the exhaust gas recirculation valve, the correction factor $t_{iEGRM}$, which is also called a pilot control value for the injection time $t_i$ in exhaust gas recirculation, is stored in a further performance graph as a function of the engine rpm n and this pressure difference $\Delta p$. The correction factor $t_{iEGRM}$ indicates the maximum influence that the exhaust gas recirculation can have on the total injection time $t_i$ and therefore on the mixture composition at the command value $STR_{COM}$ of the exhaust gas recirculation valve. In order to take deviations in the piston position of the exhaust gas recirculation valve from the command value $STR_{COM}$ into account, this pilot control value $t_{iEGR}$ is weighted with the stroke correction factor $COR_{FAC}$. The performance of this correction process is illustrated with the two flow charts (FIGS. 2 and 3).

In order to determine the duty factor TV, in a first step S1 the coolant temperature TKW of the engine is written into a working memory of the microcomputer. In a step S2, a comparison is then made whether to find whether this temperature is below a predetermined maximum warmup value TKWM. If so, then in a step S3, the factor F1 is ascertained from a performance graph or a table, as a function of the written-in coolant temperature TKW. In a further step S4, a factor F2 is written in as a function of the absolute altitude PH from a performance graph or a table. In a step S5, the basic duty factor TVG is written in from a performance graph of the working memory in which the rpm n and the intake tube pressure p are plotted. The result in a step S6, by linking of the various factors, is a total duty factor $$TV = TVG \cdot F1 \cdot F2.$$

If the response in the step S2 is negative, that is if the ascertained coolant temperature TKW is higher than the limit value TKWM, then the step S4 is skipped. This is equivalent to a factor of F1=1. In other words, the warmup phase of the engine has concluded, and full exhaust gas recirculation is possible. In a step S7, the piston position of the exhaust gas recirculation valve 20 is asked for, and this value is stored in memory in the form of the actual value $STR_{ACT}$. Next, in a step S8, the value for a command stroke $STR_{COM}$ is written in from a performance graph as a function of the intake tube pressure p and the engine rpm n, and in a next step (S9), by quotient formation a stroke factor is formed that characterizes the influence of the stroke of the exhaust gas recirculation system. As a function of this stroke factor, in a step S10, the stroke correction factor $COR_{FAC}$ is read out from a table. As a result, linearization of the exhaust gas recirculation rate over the valve stroke is attained. From a performance graph in which the rpm n and the pressure difference $\Delta p$ between the intake tube pressure and the exhaust gas counterpressure are plotted, in a step S11 a value for the injection time $t_{iEGRM}$ is written in that characterizes the maximum influence of the exhaust gas recirculation. Finally, in a step S12, this value is multiplied by the correction factor from the step S10, and the result is a pilot control value $t_{iEGR}$ for the injection time for engines with exhaust gas recirculation. Finally, the basic injection time $t_i$ is the product of the basic injection time $t_{iB}$, corrected by the pilot control value $t_{iEGR}$ and other correction factors, which have already been referred to above.

With this method, it becomes possible in a relatively simple way to establish the optimal exhaust gas recirculation quantity at every engine operating point and to inject the necessary quantity of fuel for injection.

We claim:
1. A method for controlling an internal combustion engine operating with exhaust gas recirculation and including an intake-tube-pressure-guided injection system having:
   an intake tube with a throttle valve, an exhaust pipe, a return conduit branching off from the exhaust pipe and discharging into the intake tube downstream of the throttle valve, an exhaust gas recirculation valve being disposed in the return conduit and having a valve stroke, an actuator influencing a degree of opening of the conduit for controlling an exhaust gas recirculation rate, and a stroke sensor detecting a degree of opening of the exhaust gas recirculation valve over its valve stroke for establishing an optimal exhaust gas recirculation rate, and taking the degree of opening of the exhaust gas recirculation valve into account in a calculation of an injection time for injection valves, which method comprises the steps of:
   correcting the injection time with a pilot control value being dependent on rpm and on a pressure difference between an intake tube pressure and an exhaust gas counterpressure,
   defining a stroke factor from the degree of opening of the exhaust gas recirculation valve and from a load-dependent, predetermined command value of the exhaust gas recirculation valve; and weighting the pilot control value with the stroke factor.

2. The method according to claim 1, which comprises forming an associated stroke correction factor for each stroke factor, and taking nonlinearity of the exhaust gas recirculation quantity over the valve stroke into account in the associated stroke correction factor.

3. The method according to claim 1, wherein the actuator is an electropneumatic valve, and the method comprises triggering the electropneumatic valve with a duty cycle dependent on a load state of the engine, acting upon an intake side of the actuator with the intake tube pressure, and acting upon the exhaust gas recirculation valve with the actuator through a control pressure dependent on a duty factor and on the intake tube pressure.

4. The method according to claim 3, which comprises forming the duty factor for the actuator from a basic duty factor dependent on the rpm and the intake tube pressure, from a warmup ramp, and from an altitude correction.

5. The method according to claim 4, which comprises forming an associated stroke correction factor for each stroke factor, taking nonlinearity of the exhaust gas recirculation quantity over the valve stroke into account in the associated stroke correction factor, and storing values for the basic duty factor, the warmup ramp, the altitude correction, the command value, the stroke factor, the pilot control value and the correction factor, in performance graphs of an electronic control unit of the engine.

6. In a method for controlling an internal combustion engine operating with exhaust gas recirculation and including an intake-tube-pressure-guided injection system having an intake tube with a throttle valve, a return conduit branching off from an exhaust pipe and discharging into the intake tube downstream of the throttle valve, an exhaust gas recirculation valve disposed in the return conduit and having a valve stroke defining a degree of opening of the valve, the method being of the type in which the degree of opening of the conduit is influenced with an actuator and the exhaust gas recirculation rate is controlled with the actuator, in which the degree of opening of the exhaust gas recirculation valve over its valve stroke is detected with a stroke sensor and an optimal exhaust gas recirculation rate is established, and in which the degree of opening of the exhaust gas recirculation valve is taken into account in a calculation of an injection time for injection valves, the improved method which comprises the steps of:

correcting the injection time with a pilot control value being dependent on rpm and on a pressure difference between an intake pressure and an exhaust gas counterpressure;

defining a stroke factor from the degree of opening of the exhaust gas recirculation valve and from a load-dependent, predetermined command value of the exhaust gas recirculation valve; and weighting the pilot control value with the stroke factor.

* * * * *